(12) United States Patent
Weinstock et al.

(10) Patent No.: US 11,032,226 B1
(45) Date of Patent: Jun. 8, 2021

(54) SYSTEMS AND METHODS FOR RAPID ELECTRONIC MESSAGING TESTING AND POSITIONAL IMPACT ASSESSMENT IN A PROSPECT ELECTRONIC MESSAGING SERIES

(71) Applicant: CaaStle, Inc., New York, NY (US)

(72) Inventors: Jonathan Mark Weinstock, Mountain View, CA (US); Kara Jeanne Arola, Santa Clara, CA (US)

(73) Assignee: CAASTLE, INC., New York, NY (US)

( * ) Notice: Subject to any disclaimer, the term of this patent is extended or adjusted under 35 U.S.C. 154(b) by 0 days.

(21) Appl. No.: 16/702,874

(22) Filed: Dec. 4, 2019

(51) Int. Cl.
*H04L 29/08* (2006.01)
*G06Q 10/10* (2012.01)
*H04L 12/58* (2006.01)

(52) U.S. Cl.
CPC .......... *H04L 51/16* (2013.01); *G06Q 10/107* (2013.01); *H04L 51/28* (2013.01); *H04L 67/22* (2013.01); *H04L 67/26* (2013.01)

(58) Field of Classification Search
CPC ......... H04L 51/16; H04L 51/28; H04L 67/22; H04L 67/26; G06Q 10/107
USPC ........................................................ 709/206
See application file for complete search history.

(56) References Cited

U.S. PATENT DOCUMENTS

| | | | |
|---|---|---|---|
| 8,346,875 B2 | 1/2013 | Gillai et al. | |
| 2003/0177025 A1* | 9/2003 | Curkendall | A01K 11/007 340/573.3 |
| 2008/0126190 A1* | 5/2008 | Gosnell | G06Q 20/102 705/14.25 |
| 2009/0144129 A1* | 6/2009 | Grouf | G06Q 30/0283 705/14.42 |
| 2010/0030663 A1* | 2/2010 | Wannier | G06Q 10/043 705/26.1 |
| 2011/0173094 A1* | 7/2011 | Krueger | G06Q 30/06 705/26.41 |
| 2015/0039549 A1* | 2/2015 | Aufmann | G06Q 30/0631 706/46 |
| 2015/0058083 A1* | 2/2015 | Herrero | G06Q 10/087 705/7.32 |
| 2015/0095184 A1* | 4/2015 | Ainsworth | G06Q 30/0643 705/26.7 |
| 2016/0117717 A1* | 4/2016 | Moreau | G06Q 30/0243 705/14.42 |
| 2017/0199873 A1 | 7/2017 | Barthel et al. | |

(Continued)

*Primary Examiner* — Tauqir Hussain
(74) *Attorney, Agent, or Firm* — Bookoff McAndrews, PLLC

(57) ABSTRACT

Disclosed are methods, systems, and non-transitory computer-readable medium for optimizing user experience with respect to sequences of electronic messages to drive user engagement. For example, a method may include determining a set of messages including at least a first message and a second message; transmitting the first and second messages as an initial message to a first plurality of devices and a second plurality of devices, respectively; determining a first and second performance indicator at least based on one or more responses to the first and second messages transmitted as the initial message, respectively; comparing the first performance indicator and the second performance indicator; and sorting a sequence of the set of messages based on the comparison of the first performance indicator to the second performance indicator.

17 Claims, 5 Drawing Sheets

(56) References Cited

U.S. PATENT DOCUMENTS

2017/0287044 A1* 10/2017 Rose ................... H04L 67/306
2018/0070143 A1    3/2018 Joffe et al.

* cited by examiner

SYSTEMS AND METHODS FOR RAPID ELECTRONIC MESSAGING TESTING AND POSITIONAL IMPACT ASSESSMENT IN A PROSPECT ELECTRONIC MESSAGING SERIES

TECHNICAL FIELD

Various embodiments of the present disclosure generally relate to optimizing user experience, and more particularly, to optimizing user experience with respect to sequences of electronic messages to drive user engagement.

BACKGROUND

Some businesses utilize multiple series of electronic messages (sometimes referred to as "email journeys"), to drive subscriptions or other engagement (e.g., clicks, conversions, etc.) from prospective customers who have visited an associated website. Email journeys can be thought of as a sequence of emails that are evaluated both individually and collectively as a group for effectiveness in increasing yield. Optimizing email journeys to increase yield, e.g., new subscriptions, may be a slow process. Further, it may be difficult to understand how the position of a particular email in the email journey may impacts its results.

Rapid email testing is important to maximize return on investment (ROI) from an email journey with the goal of converting prospective customers into subscribers. The challenges that prevent rapid email testing for an email journey include, but are not limited to, the following: (1) the recipient engagement often drops off in a direct correlation to the email recipient's tenure as a prospect, which results in increased time to establish a result, e.g., an understanding of the efficacy of the email series in achieving the desired goal, e.g., new subscriptions, in aggregate; (2) the time it takes to obtain a statistically significant test, e.g., understanding the efficacy of the email series in achieving the desired goal is therefore directly correlated to the number of emails in the series; and (3) difficulty of isolating variables during the testing. As an example, the emails themselves may be one variable and the order of the emails may be a second variable, and it may be difficult to isolate the impact of the two variables. The difficulty of isolating the impact of particular variables may add further time to the testing.

Some existing email systems allow testing of an individual email, e.g., via A/B testing, but such testing falls short because the tests are performed with respect to the individual email and without regard to the concept of an email journey, i.e., a coordinated series of email messages. Accordingly, existing systems do not provide the ability to isolate a positional impact variable. Therefore, there exists a need for email journey optimization with respect to both the email content for each email included in the email journey and the sequence of the emails included in the email journey.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, systems and methods are disclosed for optimizing user experience to overcome the problems with conventional methods noted above.

In one embodiment, a computer-implemented method comprises: determining, by one or more processors, a set of messages including at least a first message and a second message; assigning, by the one or more processors, the first message as a first initial message from the set of messages to be transmitted to one or more user devices; transmitting, by the one or more processors, the set of messages to a first plurality of devices associated with user identifiers, wherein each of the first plurality of user identifiers is associated with a customer of an electronic subscription platform, and wherein the first message is transmitted as the first initial message from the set of messages to the first plurality of devices associated with user identifiers; determining, by the one or more processors, a first performance indicator at least based on one or more responses to the first message transmitted as the first initial message from the set of messages; assigning, by the one or more processors, the second message as a second initial message from the set of messages to be transmitted to one or more user devices; transmitting, by the one or more processors, the set of messages to a second plurality of devices associated with user identifiers, wherein each of the second plurality of user identifiers is associated with a customer of the electronic subscription platform, and wherein the second message is transmitted as the second initial message from the set of messages to the second plurality of devices associated with user identifiers; determining, by the one or more processors, a second performance indicator at least based on one or more responses to the second message transmitted as the second initial message from the set of messages; comparing, by the one or more processors, the first performance indicator and the second performance indicator; and sorting, by the one or more processors, a sequence of the set of messages based on the comparison of the first performance indicator to the second performance indicator.

In accordance with another embodiment, a computer system comprises: a data storage device storing processor-readable instructions; and a processor configured to execute the instructions to perform a method. The method may include: determining a set of messages including at least a first message and a second message; assigning the first message as a first initial message from the set of messages to be transmitted to one or more user devices; transmitting the set of messages to a first plurality of devices associated with user identifiers, wherein each of the first plurality of user identifiers is associated with a customer of an electronic subscription platform, and wherein the first message is transmitted as the first initial message from the set of messages to the first plurality of devices associated with user identifiers; determining a first performance indicator at least based on one or more responses to the first message transmitted as the first initial message from the set of messages; assigning the second message as a second initial message from the set of messages to be transmitted to one or more user devices; transmitting the set of messages to a second plurality of devices associated with user identifiers, wherein each of the second plurality of user identifiers is associated with a customer of the electronic subscription platform, and wherein the second message is transmitted as the second initial message from the set of messages to the second plurality of devices associated with user identifiers; determining a second performance indicator at least based on one or more responses to the second message transmitted as the second initial message from the set of messages; comparing the first performance indicator and the second performance indicator; and sorting a sequence of the set of messages based on the comparison of the first performance indicator to the second performance indicator.

In accordance with another embodiment, a non-transitory computer-readable medium containing instructions that, when executed by a processor, causes the processor to perform a method. The method may include: determining a set of messages including at least a first message and a second message; assigning the first message as a first initial message from the set of messages to be transmitted to one or more user devices; transmitting the set of messages to a first plurality of devices associated with user identifiers, wherein each of the first plurality of user identifiers is associated with a customer of an electronic subscription platform, and wherein the first message is transmitted as the first initial message from the set of messages to the first plurality of devices associated with user identifiers; determining a first performance indicator at least based on one or more responses to the first message transmitted as the first initial message from the set of messages; assigning the second message as a second initial message from the set of messages to be transmitted to one or more user devices; transmitting the set of messages to a second plurality of devices associated with user identifiers, wherein each of the second plurality of user identifiers is associated with a customer of the electronic subscription platform, and wherein the second message is transmitted as the second initial message from the set of messages to the second plurality of devices associated with user identifiers; determining a second performance indicator at least based on one or more responses to the second message transmitted as the second initial message from the set of messages; comparing the first performance indicator and the second performance indicator; and sorting a sequence of the set of messages based on the comparison of the first performance indicator to the second performance indicator.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
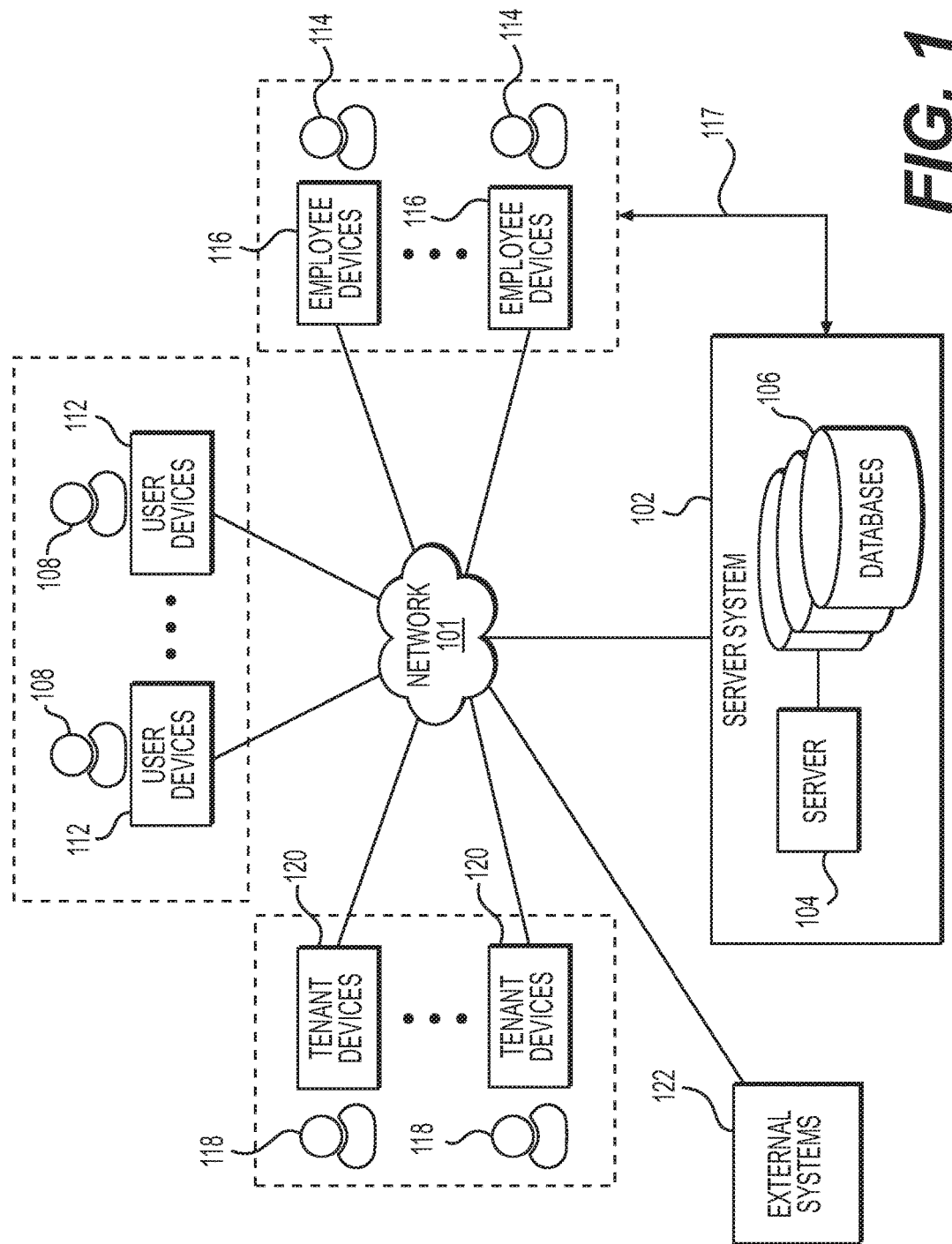
FIG. 1 depicts an example environment in which methods, systems, and other aspects of the present disclosure may be implemented.

Reference will now be made in detail to the exemplary embodiments of the disclosure, examples of which are illustrated in the accompanying drawings. Wherever possible, the same reference numbers will be used throughout the drawings to refer to the same or like parts.

In some embodiments, the present disclosure describes a persistent test, e.g., persistent A/B testing, on the first message of a message series (e.g., that may comprise an email journey) to increase testing throughput, identify optimal content for each message in the message series and determine an optimal order of messages of the series of messages. For example, the present disclosure describes a persistent test for the first email of a message series (also referred to as an email series) that a prospective customer may receive when the customer signs up as a prospective subscriber of an electronic commerce system, such as a clothing or other product subscription or rental service, for example. In some embodiments, one or more prospective customers may be subjected to a control version (also referred to as the default version), e.g., an "A" version, or a test version, e.g., a "B" version, of the first email. The A version may be the current implementation of a first email included in an email journey and the B version may be a test version of the first email, where the results (e.g., prospective customer responses to the first email) for the B version may be compared with the results for the A version. As an example, half of the one or more prospective customers may receive the A version, while the remaining half of the one or more prospective customers receive the B version. In some embodiments, 70 percent of the one or more prospective customers may receive the A version, while the remaining 30 percent of the one or more prospective customers receive the B version. The percentages of the one or more prospective customers receiving the A and B versions described above are for explanatory purposes only, and may vary for alternative embodiments.

Each email in the email series may be tested as the B version and the results may be compared with the results from that of the default A version. In some embodiments, each test may be run until statistical significance, e.g., as determined by a 1-tail statistical calculation resulting in a p-value of 0.05 or less, is reached. A performance metric may be determined for each test for the A and B versions. For example, the clicks per send metric in response to the A and B versions may be recorded and the email with the best clicks per send metric may be determined as the optimal email for the first email of the email journey.

Once an optimal email is determined, the optimal email may be designated as the A version and the remaining emails included in the email series may be positioned within the email series based on each respective clicks per send metric as measured by respective tests against the A version. In some embodiments, each remaining email within the email series may be subsequently tested against the A version to determine each email's respective clicks per send value in an initial ordinal position test (also referred to as a "boot up processing test"). The emails within the email series may be ordered based on each respective clicks per send results obtained from testing the email in the initial ordinal position test. For example, each of the emails included in the email series may be ordered based on clicks per send in declining order, thereby obtaining an optimally ordered email series. In some embodiments, the optimally ordered email series may be designated as the current email journey.

In some embodiments, the optimally ordered email journey, i.e., the current email journey, may be subsequently evaluated on an individual email basis based on the same metric, e.g. clicks per send. For example, the clicks per send metric may be determined for an exemplary email "X" which has been reordered for the current email journey, The determined clicks per send metric for email "X" in its reordered position may be compared to the clicks per send metric for the email "X" in its prior position, e.g., prior to being reordered in the current email journey. As another example, the determined clicks per send metric for email "X" in its reordered position may be compared to the clicks per send metric for email "X" when assigned as an initial email, e.g., tested as version B, during the initial ordinal position test. In such instances, the difference (i.e., the delta) in the clicks per send metric may be utilized to determine a positional difference which can then be used to determine the impact of the order based on the clicks per send metric in the email journey.

In some embodiments, new experimental emails for further inclusion in a current email journey ay be designated as the B version, tested, and be included in the current email journey based on the test results. For example, a new experimental email may be tested as the B version and the results for the new experimental email may be compared with the results from that of the default A version (e.g., the initial email for the current email journey). Accordingly, the new experimental email may be included in the current email journey based on the comparison. That is, the new experimental email may be positioned in the appropriate position within the current email journey based on the comparison. In some embodiments, the results for the new experimental email may exceed the results for the default A version. In such embodiments, the new experimental email may become the default A version for the current email journey. In some embodiments, the new experimental email may be compared with other emails included in the current email journey in addition to the default A version. In such embodiments, the new experimental email may be included in the current email journey based on the comparisons. That is, the new experimental email may be placed in the appropriate order within the current email journey based on the comparisons.

Current testing platforms do not have tools to facilitate result prediction based on the positions of emails within an email journey. Accordingly, current testing platforms fail to facilitate ordering of emails within the email journey to maximize results for the email journey.

Significant advantages provided by the current application may include, but are not restricted to the following. First, the current application enables a persistent test on the first email of an email series to rapidly test email content and rank the order of the emails in the email series based on email clicks per recipient. In some embodiments, the ordered emails may comprise the current email journey. It is understood that the clicks per recipient metric is provided merely as an example, and various metrics may be utilized in alternative embodiments. Second, a position impact curve may be developed based on the use of progressive testing of the emails within the current email journey via a persistent test on the first email and a subsequent comparison of the results for individual emails within the current email journey based on a persistent test of each individual email in the initial ordinal position of the email series (e.g., the position of the individual email within the email series prior to being ordered based on the initial ordinal position test) compared with the position in the current email journey (e.g., the email series placed in optimal order). The position curve may be used to predict the clicks per recipient key performance indicator (KPI) of an email based on the test results from the persistent test. This allows the determination of how a new email will perform based on a proposed position. Accordingly, the current application may provide the significant advantage of rapidly testing to identify the best emails within the email series and optimally sequencing these emails to maximize a business KPI, e.g., clicks per recipient metric. Additionally, the derived positional result curve may assist in forecasting the results that may be obtained from new content tested in the initial ordinal position test and placed within the current email journey.

Although the present disclosure frequently refers to the use of electronic messages in the format known as "e-mail," it should be appreciated that the present disclosure and the above and below description of "persistent A/B testing" are applicable to any type of electronic messages, including in-app messages, mobile OS notifications, chat messages, bot messages, SMS messages, or any other type of electronic messages that can be sent between users and an electronic commerce system, such as a clothing subscription service.

In addition, while the exemplary system architecture as described in the present disclosure relates to electronic transactions for subscribing to, purchasing, or renting wearable items (e.g., clothing-as-a-service (CaaS) or Try-Then-Buy (TTB) service), implementations disclosed herein may effectively serve various other online transactions in the context of any other subscription, purchase, rental, or retail services without departing from the scope of the disclosure, such as, for example, subscribing to or making purchases in a software service, cleaning service, delivery service, maintenance service, rental product, rental vehicles, etc. In addition, while some descriptions and examples disclosed in the present disclosure refer to certain exemplary transactions as transactions pertaining to "apparel" or "garments," all of those transactions may effectively serve any wearable item (e.g., an article of clothing, apparel, jewelry, hat, accessories, or any other product which may be worn), or even hospitality linens, consumer goods, or any other textile fabrics, without departing from the scope of the disclosure.

As used in the present disclosure, the term "CaaS" (i.e., clothing-as-a-service) may collectively refer to computer-implemented services and functions associated with subscription, purchase, and/or rental services for users (e.g., periodic subscription for receiving wearable items, apparel rental or purchase order, distribution, return processing, TTB services, account management, marketing, customer service, warehouse operations, etc.). As used in the present disclosure, the term "wearable item" may refer to any article of clothing, apparel, jewelry, hat, accessories, or other product which may be worn by a person, an animal, or a thing, or be used as an ornament for a person, an animal, or a thing. As used herein, the term "closeting" or "to closet" may refer to a computer-implemented operation of placing one or more garments into a virtual closet (e.g., a cart, a repository, or any type of space which may be virtually associated with a particular set of one or more garments for a future transaction). Additionally, "matching" may refer to a computer-implemented operation of determining a set of one or more garments for allocating to a user and/or determining wearability metrics for given garments, and "allocating" or "allocation" may refer to a computer-implemented operation of determining the garments that should be assigned and shipped to one or more particular users.

In accordance with the present disclosure, user interfaces, periodically executed computer-implemented services, ad hoc services, and automations being integrated together in a connected platform may be achieved by a uniquely configured system architecture, job execution cluster configuring one or more processors to perform both storefront and back office tasks, and various user interfaces providing specialized or customized access to users of different roles. For example, the system may periodically collect vast amounts of data attributes from historical transactions, form data sets indicative of each user's relationship with certain apparel (e.g., a binary flag of whether a shipped garment was actually worn by a user) in the back end, and train a neural network with those data sets to make specific front-end user recommendations with highly wearable apparel. The ordered combination of various ad hoc and automated tasks in the presently disclosed platform necessarily achieve technological improvements through the specific processes described more in detail below. In addition, the unconventional and unique aspects of these specific automation processes represent a sharp contrast to merely providing a well-known or routine environment for performing a manual or mental task.

The subject matter of the present description will now be described more fully hereinafter with reference to the accompanying drawings, which form a part thereof, and which show, by way of illustration, specific exemplary embodiments. An embodiment or implementation described herein as "exemplary" is not to be construed as preferred or advantageous, for example, over other embodiments or implementations; rather, it is intended to reflect or indicate that the embodiment(s) is/are "example" embodiment(s). Subject matter can be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The term "or" is meant to be inclusive and means either, any, several, or all of the listed items. The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

Referring now to the appended drawings, FIG. 1 shows an example environment 100, according to one or more embodiments of the present disclosure. As shown, the example environment 100 may include one or more networks 101 that interconnect a server system 102, user devices 112, employee devices 116, tenant devices 120, and external systems 122. The one or more networks 101 may be, for example, one or more of a cellular network, a public land mobile network, a local area network, a wide area network, a metropolitan area network, a telephone network, a private network, an ad hoc network, an intranet, the Internet, a fiber optic based network, a cloud computing network, etc. User devices 112 may be accessed by users 108, employee devices 116 may be accessed by authorized employees 114, and tenant devices 120 may be accessed by employees of tenant entities 118. In some implementations, employee devices 116 may be used to perform the functions of the tenant devices 120 and/or the user devices 112. Server system 102 may comprise one or more servers 104 and one or more databases 106, which may be configured to store and/or process a plurality of data, microservices, and service components, and/or associated functions thereof, as described in more detail below with respect to FIG. 2.

Users 108 may access the server system 102 through the one or more networks 101 using user devices 112. Each device among the user devices 112 may be any type of computing device (e.g., personal computing device, mobile computing devices, etc.) which allows users 108 to display a web browser or a web-based application for accessing the server system 102 through the network 101. The user devices 112 may, for example, be configured to display a web browser, a web-based application, or any other user interface (e.g., one or more mobile applications) for allowing users 108 to exchange information with other device(s) or system(s) in the environment 100 over the one or more networks 101. For example, a device among the user devices 110 may load an application with a graphical user interface (GUI), and the application may display on the GUI one or more apparel recommendations for closeting by the user. Users 108 accessing user devices 112 may be, for example, users and/or potential users of apparel made available for subscription-based distribution via electronic transactions and physical shipment. Additionally, or alternatively, users 108 may access user devices 112 to, for example, manage one or more user accounts, view catalogs, configure one or more user profiles, engage in customer service communications, make purchase orders, track shipments, generate shipments, monitor order fulfillment processes, initiate or process returns, order apparel for purchase, provide feedback, refer other users, navigate through various features such as size advisor, perform personalized discovery, and/or make recommendations.

Employee devices 116 may be configured to be accessed by one or more employees 114, including, for example, customer service employees, marketer employees, warehouse employees, analytics employees, or any other employees who are authorized and/or authenticated to perform tasks, operations, and/or transactions associated with the server system 102, and/or the external systems 122. In one embodiment, employee devices 116 are owned and operated by the same entity or at least an affiliate of the entity operating the e-commerce (e.g., CaaS) business hosted on server systems 102. Each device among the employee devices 116 may be any type of computing device (e.g., personal computing device, mobile computing devices, etc.). The employee devices 116 may allow employees 114 to display a web browser or an application for accessing the server system 102 and/or the external systems 122, through the one or more networks 101. For example, a device among the one or more of the employee devices 116 may load an application with graphical user interface (GUI), and the application may display on the GUI one or more warehouse operations associated with providing CaaS to users 108. In some implementations, the employee devices 116 may communicate directly with the server system 102 via communications link 117 bypassing public networks 101. Additionally, or alternatively, the employee devices 116 may communicate with the server system 102 via network 101 (e.g., access by web browsers or web-based applications).

Tenant devices 120 may be configured to be accessed by one or more tenants 118. Each device among the tenant devices 120 may be any type of computing device (e.g., personal computing device, mobile computing devices, etc.). As used herein, each tenant, among one or more tenants 118, may refer to an entity that allocates and/or supplies one or more specific collections of apparel for the CaaS inventory. For example, each of the one or more tenants 118 may be a retailer, a designer, a manufacturer, a merchandizer, or a brand owner entity that supplies one or more collections of wearable items to the CaaS inventory managed and/or accessed by the server system 102. In some embodiments, tenants 118 may use one or more electronic tenant interfaces (e.g., a catalog content management system associated with each tenant) to provide the server system 102 with wearable item data that describe apparel or wearable items made available for electronic transactions on server system 102. For example, one or more catalogs for each of the one or more tenants 118 may be generated and/or updated at the server system 102 dynamically and/or periodically. Tenant devices 120 may serve as access terminals for the tenants 118, for communicating with the electronic tenant interfaces and/or other subsystems hosted at the server system 102. The tenant devices 120 may, for example, be configured to display a web browser, an application, or any other user interface for allowing tenants 118 to load the electronic tenant interfaces and/or exchange data with other device(s) or system(s) in the environment 100 over the one or more networks 101.

External systems 122 may be, for example, one or more third party and/or auxiliary systems that integrate and/or communicate with the server system 102 in performing various CaaS tasks. Specific examples of the external systems 122 are described in detail below with respect to FIG. 2. External systems 122 may be in communication with other device(s) or system(s) in the environment 100 over the one or more networks 101. For example, external systems 122 may communicate with the server system 102 via API (application programming interface) access over the one or more networks 101, and also communicate with the employee devices 116 via web browser access over the one or more networks 101. In some embodiments, the server system 102 may include one or more components of the external systems 122.

As indicated above, FIG. 1 is provided merely as an example. Other examples that differ from the example environment 100 of FIG. 1 are contemplated within the scope of the present embodiments. In addition, the number and arrangement of devices and networks shown in system 100 are provided as an example. In practice, there may be additional devices, fewer devices and/or networks, different devices and/or networks, or differently arranged devices and/or networks than those shown in system 100. Furthermore, two or more devices shown in FIG. 1 may be implemented within a single device, or a single device shown in FIG. 1 may be implemented as multiple, distributed devices. Additionally, or alternatively, one or more devices may perform one or more functions of other devices in the example environment 100. For example, employee devices 116 may be configured to perform one or more functions of tenant devices 120, in addition to their own functions.

Figure 2:
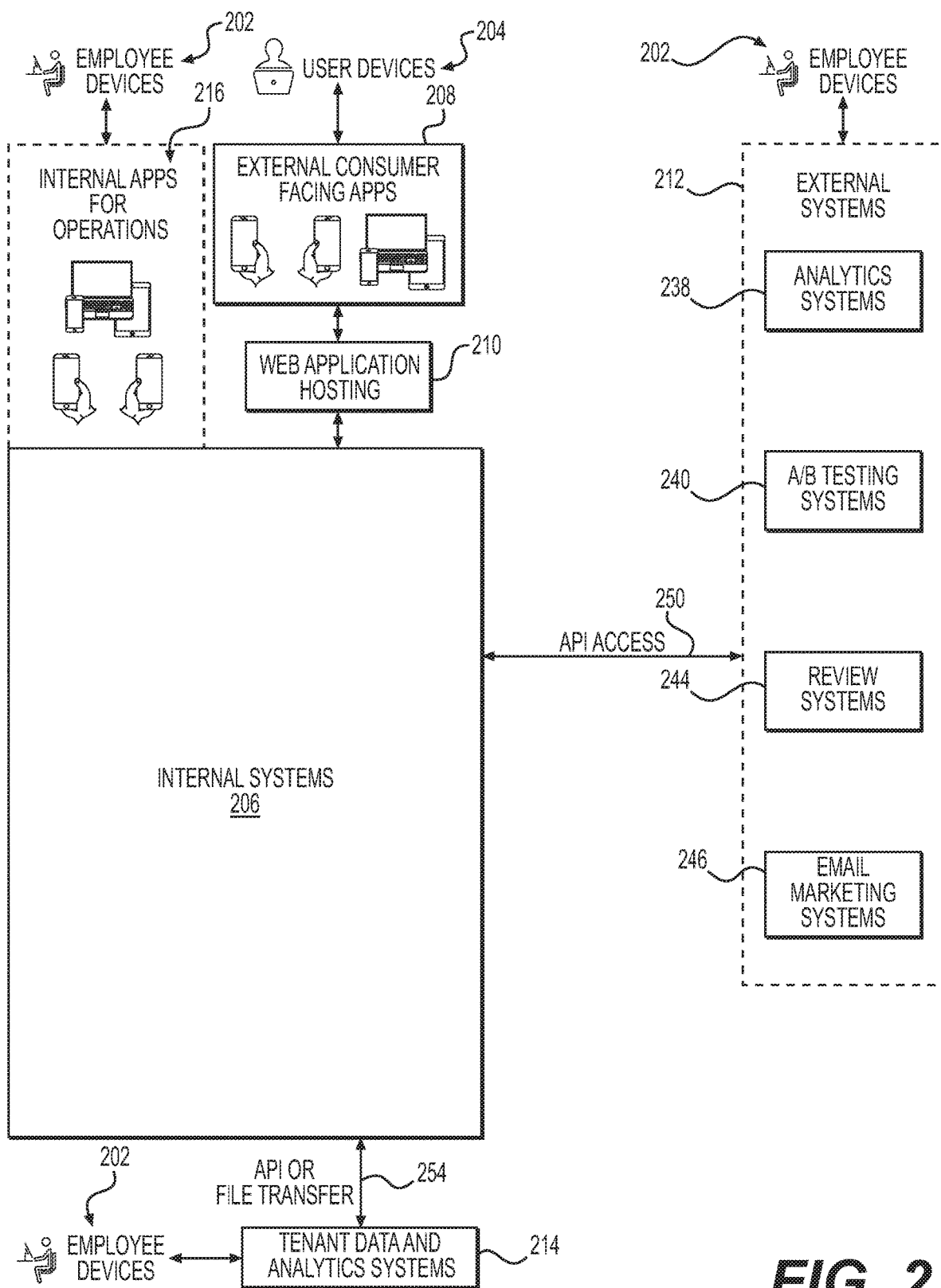
FIG. 2 depicts a schematic diagram depicting an architecture of an exemplary environment for a clothing-as-a-service electronic platform, according to one or more embodiments.

FIG. 2 depicts a schematic diagram of an exemplary architecture 200 for a clothing-as-a-service electronic platform, according to one or more embodiments. The components of the architecture may be accessed by authorized terminals, such as employee devices 202 and user devices 204, over the one or more networks 101 or via any one or more other types of network (e.g., a cellular network, a public land mobile network, a local area network, a wide area network, a metropolitan area network, a telephone network, a private network, an ad hoc network, an intranet, the internet, a fiber optic based network, a cloud computing network, etc.). As used herein, the user devices 204 may correspond to any one or more user devices 112 depicted in FIG. 1, and the employee devices 202 may correspond to any one or more of the employee devices 116 and/or tenant devices 120 depicted in FIG. 1.

As shown in FIG. 2, in general, architecture 200 may comprise an internal system 206, external consumer facing apps 208, a web application hosting server 210, external systems 212, and tenant data and analytics systems 214. Internal system 206 may comprise internal apps for operations, API endpoints, app endpoints, login endpoints, tenant aware services, tenant aware transactional data stores, back office jobs, data warehouse systems, file stores-snapshots, and $3^{rd}$ party data ETL processes. In some embodiments, the internal system 206 may include one or more components of the external systems 212.

In operation, employee devices 202 may access the internal system 206, which may be stored at networked, distributed, and/or local systems (e.g., one or more virtual private clouds and/or one or more physical private networks). As used herein, a virtual private cloud may refer to a configurable pool of shared computing resources within a cloud environment, with groups of shared computing resources being allocated for a particular job(s), user(s) and/or a purpose(s). The internal system 206 may represent a virtual private cloud allocated for hosting the entirety of the internal system 206. Additionally, the internal system 206 may include multiple virtual private clouds (e.g., subsets of the larger virtual private cloud encompassing the internal system 206), each allocated for one or more particular tasks, users, or purposes (e.g., tenant aware services, back office jobs, and data warehouse systems).

The employee devices 202 may communicate with the internal system 206 through one or more internal apps 216 comprising one or more web-based portals or user interfaces for operations. The one or more internal apps 216 may be, for example, an electronic warehouse operations portal and/or an electronic administrative portal. The one or more internal apps 216 may include one or more web-based user interfaces, such as, for example, one or more mobile applications compatible with predetermined mobile device operating systems, a software application developed for desktop operating systems, and/or a web site configured for browser access to web pages via one or more networks (e.g., the Internet or an intranet). Employees 116 or tenants 118 may use employee devices 202 to access the internal system 206 and perform various CaaS functions related to warehouse operations and/or administrative tasks.

The internal system 206 may also include Application Programming Interface ("API") endpoints, APP (application) endpoints, and login endpoints. In some implementations, these endpoints may be hosted in a virtual private cloud or a physical private network with a preconfigured level of isolation from other virtual private clouds or physical private networks hosting different components of the internal system 206. The API endpoints may be locations from which the APIs can access resources of the internal system 206 that the APIs need to carry out their functions. For example, the API endpoints may specify where resources can be accessed by the APIs, while communicating with the APIs requesting information from the internal system 206. Similarly, the APP endpoints may be the locations from which applications (e.g., applications in one or more internal apps 216) may access resources of the internal system 206 they need to carry out their functions, and the login endpoints may be the touchpoints of any communication pertaining to logins (e.g., authentication and access control) associated with the internal system 206. For example, the login endpoints may receive and process login communications, for internal apps 216 and/or external consumer facing applications 208. For some implementations, at least some endpoints among the API endpoints, APP endpoints, and login endpoints, may be tenant branded endpoints, designated to serve particular tenants 118.

The internal system 206 may additionally include tenant aware services and tenant aware transactional data stores. The tenant aware services may include microservices for fulfillment of various CaaS operations hosted in one or more virtual private clouds or one or more physical private networks. For example, the microservices may include, for example, catalog data, account data, data services, customer service functions, marketing functions, warehouse functions, and/or other supporting functions. The tenant aware transactional data stores may be one or more databases that store both raw and processed data resulting from operations of the tenant aware services, the endpoints, external systems 212, and/or tenant data and analytics systems 214. The tenant aware transactional data stores may store, for example, transactional data, batch jobs data, searchable data including various analytics and attributes, event messages, and local logs of various raw data.

The internal system 206 may additionally include back office jobs, which may comprise instructions, files, or executable applications configured to perform various back office tasks and/or computing resources to execute these instructions or applications. The back office jobs may be hosted in, for example, one or more virtual private clouds. The back office jobs may include, for example, all system components that run and update data (e.g., a first order data or any derived data) associated with the internal system 206. Such system components may include, for example, replenishment identifier (RID) generation service(s), size advisor data set, size advisor algorithmic preparation component(s), recommendation service(s), search data sets, etc. The back office jobs may include, for example, ETL (extract, transform, and load) processes that comprise collecting data from multiple different sources (e.g., tenant aware transactional data stores), converting the collected data to other one or more preset formats as deemed necessary, and loading the data into the target database (e.g., data warehouse systems). The back office jobs may also include, for example, periodic data refresh operations, periodic synchronization states among internal and external services, and automated tasks to run in the background at the internal system 206.

The internal system 206 may include the file stores for snapshots in one or more virtual private clouds or one or more physical private networks. The file stores of snapshots may store snapshots capturing states of the internal system 206 at particular points in time. For example, each snapshot may capture settings, files, configurations, and the memory state of the components of the internal system 206. These snapshots may be restored upon request or scheduling, and when a snapshot is restored, settings, and/or the state of the internal system 206 may be returned to the states they were in at the time the snapshots were captured.

The internal system 206 may include third party data ETL processes, which may collect data from different external sources (e.g., external systems 212), convert the collected data to other one or more preset formats as deemed necessary, and load the data into one or more target databases (e.g., data warehouse systems and/or tenant data and analytics system 214).

The internal system 206 may include the data warehouse systems 230 in one or more virtual private clouds or one or more physical private networks. As discussed above with respect to the back office jobs and the third party data ETL processes, the data warehouse systems may be the one or more target databases for ETL processes that collect data from various sources (e.g., the external systems 212 or the tenant aware transactional data stores). The data warehouse systems may then utilize the collected data as, for example, parameters for business intelligence that reveals patterns, analytics, and insights for business decisions associated with the internal system 206.

The exemplary environment 200 may include tenant data and analytics systems 214. The tenant data and analytics systems 214 may be computing resources in communication with one or more components of the internal system 206 in order to collect, store, and/or manage data and analytics associated with the one or more tenants 118. One or more of the tenant data and analytics systems 214 may be located remotely from the internal system 206 (e.g., at tenant servers). The tenant data and analytics systems 214 may communicate with the components of the internal system 206 using API access or file transfer link 254 over one or more networks 101. For example, the tenant data and analytics systems 214 may communicate with the API endpoints of the internal system 206, or receive files from third party data ETL processes. The tenant data and analytics systems 214 may be accessed by employee devices 202, which may correspond to employee devices 116 or the tenant devices 120 depicted in FIG. 1.

As shown in FIG. 2, the exemplary environment 200 may also include user devices 204, which may correspond to the user devices 112 depicted in FIG. 1. Users 108 of the CaaS electronic platform may use the user devices 204 to access the internal system 206, as recipients of the services provided by the components of the internal system 206. For example, the users 108 of the user devices 204 may be one or more registered subscribers who physically receive and wear the items that are distributed via the CaaS electronic platform. As another example, the users 108 of the user devices 204 may be one or more potential subscribers to the CaaS electronic platform. In the context of the current disclosure, a group of such potential subscribers are referred to as a prospect cohort. As shown in FIG. 2, user devices 204 may access the internal system 206 via external consumer facing applications 208. The external consumer facing applications 208 may be browser-accessed web pages or web-based applications that include web-based user interfaces accessible from one or more user devices 204 over one or more networks (e.g., one or more networks 101).

In some implementations, the exemplary environment 200 may include web application hosting server 210 to serve as an intermediary for enabling communications made between the user devices 204 and the internal system 206. The web application hosting server may be an external (e.g. third party) server that provides an online platform for, for example, building a web-based storefront interface and integrating online retail components (e.g., online point-of-sale system) onto the storefront interface, for vendors such as the internal system 206. The web application hosting server 210 may communicate with the internal system 206 (e.g., the API endpoints, the APP endpoints, and/or an employee device 202 logged into the internal system 206), to retrieve necessary information about the internal system 206, and to generate or dynamically update an online storefront for the user devices 204. The user devices 204 may, in turn, access the online storefront generated or dynamically updated by the web application hosting server 210, through the external consumer facing applications 208. In this way, the external consumer facing applications 208 may allow user devices 204 to not only communicate with the internal system 206, but also to communicate with external systems 212. Such communication with the external systems 212 may be enabled by use of one or more API access communication links 250 interconnecting the internal system 206 and the external systems 212.

The exemplary environment 200 may additionally include external systems 212 (e.g., systems corresponding to the external systems 122 depicted in FIG. 1), that may be accessed by employee devices 202 (e.g., devices corresponding to employee devices 116 and/or the tenant devices 120 depicted in FIG. 1), and also by the internal system 206 (e.g., the system corresponding to server system 102 depicted in FIG. 1). The employee devices 202 may access the external systems 212 over one or more networks, using, for example, web browser access or user interfaces included in one or more web-based application. Additionally, as shown in FIG. 2, the internal system 206 may also access the external systems over the one or more networks, using, for example, one or more API access processes 250.

The external systems 212 may include, for example, analytics systems 238, A/B testing systems 240, review systems 244, and email marketing systems 246. The analytics systems 238 may include one or more web analytics tools provided by an external (e.g., third party) server, that provides dashboards, logs, or reports pertaining to, for example, tracking and reporting website traffic for the vendor (e.g., employees 116). For example, an analytics tool may be configured to display poorly functioning pages, where visitors came from, how long the visitors stayed on the website, the visitors' geographical position, visitor segmentation information, sales activity and performance, and detailed information about current visitors. The analytics systems 238 may be accessed by employee devices 202 (e.g., a vendor of these solutions) to, for example, customize settings, data, and/or configurations, and utilize the analytics data for business intelligence.

A/B testing systems 240 may include A/B testing tools for measuring and optimizing user experience by, for example, measuring subjects' response to variant A against variant B and determining which of the two variants is more effective. The A/B testing tool may be provided by an external (e.g., third party) server. In the context of the CaaS electronic platform provided by the internal system 206, the A/B testing systems 240 may perform an A/B test on, for example, a closet interface with a virtual assistant and a closet interface without a virtual assistant. As another example, the A/B testing systems 240 may perform an A/B test on emails, as will be described in further detail below. Results of the experimentations may be provided to employee devices 202 (e.g., a vendor of these solutions) to, for example, utilize the results for business intelligence.

The review systems 244 may include user review receiving tools provided by an external (e.g., third party) server. For example, a user review receiving tool in the review systems 244 may provide a platform for users to add reviews, ratings, and/or user generated content such as videos, to be published for display at the external consumer facing applications 208. The review systems 244 may be accessed by employee devices 202 (e.g., a vendor of these tools) to, for example, import reviews for analytics and business intelligence, and/or customize settings and configurations.

The email marketing systems 246 may include email marketing automation and analytics tools, provided by an external (e.g., third party) server. For example, an email marketing automation tool may maintain mailing lists and mailing schedules, and may modify email marketing messages based on what recipients read, click on, or forward. The email marketing systems 246 may be accessed by employee devices 202 (e.g., a vendor of these tools) to, for example, manage communication preferences, the content, and/or vendor subscription settings.

The number and arrangement of devices, components, and communication networks shown in FIG. 2 are provided as an example. In practice, there may be additional devices, components, and/or communication networks, fewer devices, components, and/or communication networks, different devices, components, and/or communication networks, or differently arranged devices, components, and/or communication networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
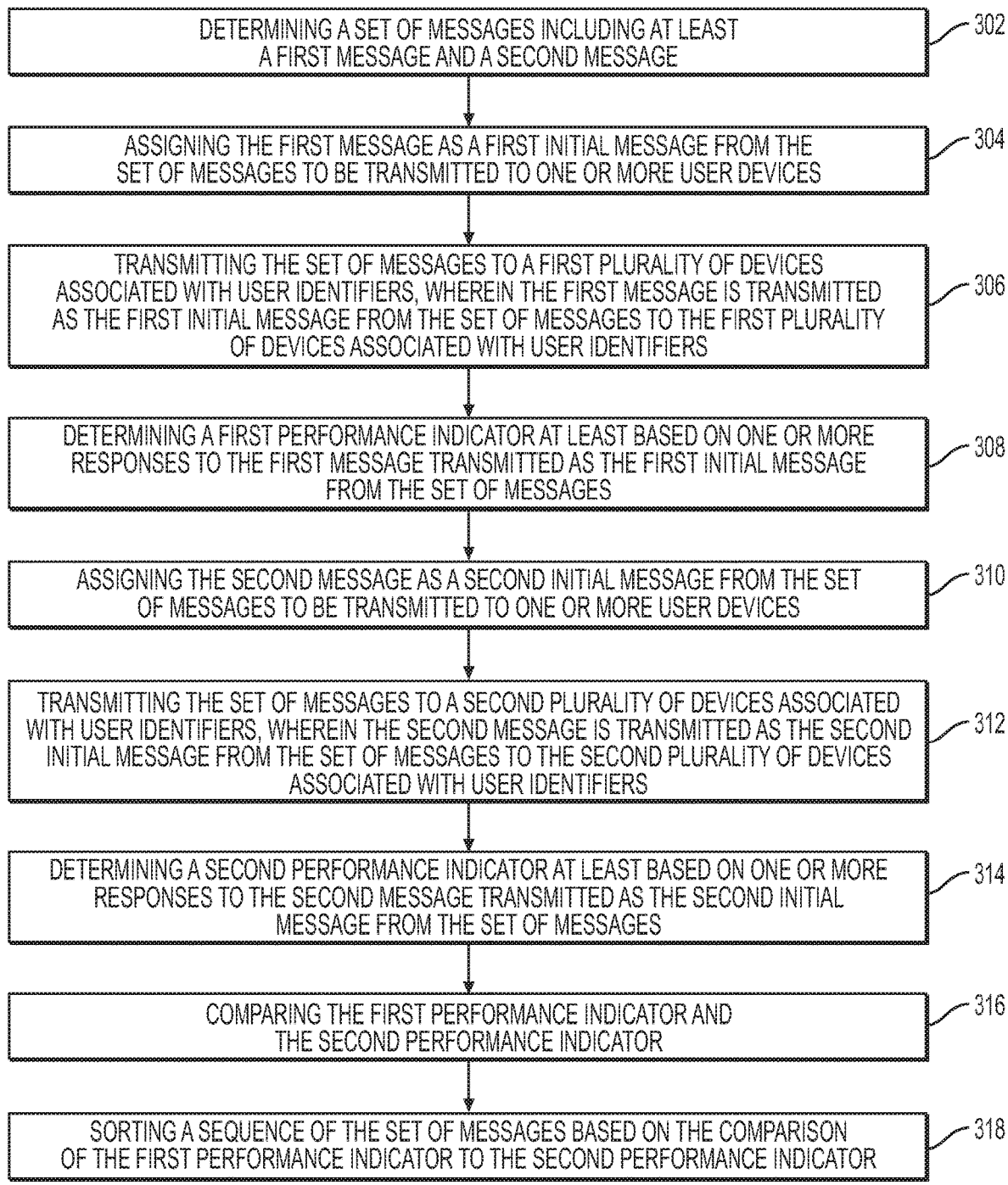
FIG. 3 depicts an exemplary method of optimizing user experience, according to exemplary embodiments of the present disclosure.

FIG. 3 depicts an exemplary method 300 of optimizing user experience, according to exemplary embodiments of the present disclosure. In one embodiment, method 300 may be performed by one or more combinations of internal systems 206, internal apps for operations 216, employee devices 202, as well as external systems 212, including analytics systems 236, A/B testing systems 240, review systems 244, and e-mail marketing systems 246, to perform a method of testing and sorting electronic messages, such as e-mails, to drive user engagement and subscriptions of an electronic commerce platform, such as a clothing rental service. Specifically, any of the systems, devices, and components of FIG. 2 may interact to perform the steps of method 300 to send messages to users (prospective customers or subscribers), analyze and test responses to those messages, sort and revise messages, and send additional or new messages to prospective customers or subscribers. It is understood that the steps depicted in and described with reference to FIG. 3 may be performed in any order, e.g., in parallel.

As shown in FIG. 3, in step 302, a set of messages including at least a first message and a second message may be determined. In some embodiments, the first and second messages may contain any type of content that may provide value to a prospective subscriber. For example, the first and second messages may each be one of the following: a monetary value email (e.g., a rent value email), a funnel email, an offer email, a recommendation email, a time sensitive offer email, a recommendation email or a testimonial email. In some embodiments, the first message and the second message may be positioned in an initial order. For example, the initial order may indicate that the first message may be transmitted before the second message. As another example, the first message may be the A version of a first email included an email journey and the second message may be the B version as described herein. In step 304, the first message may be assigned as a first initial message from the set of messages to be transmitted to one or more user devices. In step 306, the set of messages may be transmitted to a first plurality of devices associated with user identifiers, where the first message is transmitted as the first initial message from the set of messages to the first plurality of devices associated with user identifiers. In some embodiments, each of the first plurality of user identifiers may be associated with a customer of an electronic subscription platform. In step 308, a first performance indicator may be determined at least based on one or more responses to the first message transmitted as the first initial message from the set of messages. In some embodiments, determining the first performance indicator may include determining a first click per send measurement for the customers associated with the first plurality of user identifiers.

In step 310, the second message may be assigned as a second initial message from the set of messages to be transmitted to one or more user devices. In step 312, the set of messages may be transmitted to a second plurality of devices associated with user identifiers, where the second message may be transmitted as the second initial message from the set of messages to the second plurality of devices associated with user identifiers. In some embodiments, each of the second plurality of user identifiers may be associated with a customer of the electronic subscription platform. In step 314, a second performance indicator may be determined at least based on one or more responses to the second message transmitted as the second initial message from the set of messages. In some embodiments, determining the second performance indicator includes determining a second click per send measurement for the customers associated with the second plurality of user identifiers.

In some embodiments, the first performance indicator and/or the second performance indicator may be compared with a predetermined threshold. For example, the determined first click per send measurement and/or the determined second click per send measurement may be compared with a predetermined click per send measurement. In such embodiments, the first message and/or the second message may be discarded upon a determination that the first performance indicator and/or the second performance indicator does not exceed the predetermined threshold. It is understood that the comparison of the first performance indicator and the second performance indicator with the predetermined threshold may be performed in any order. For example, the comparison of the first performance indicator and the second performance indicator with the predetermined threshold may be performed in parallel.

In step 316, the first performance indicator may be compared with the second performance indicator. In some embodiments, comparing the first performance indicator and the second performance indicator may include comparing the determined first click per send measurement and the determined second click per send measurement. In step 318, a sequence of the set of messages may be sorted based on the comparison of the first performance indicator to the second performance indicator. In some embodiments, sorting the sequence of the set of messages based on the comparison of the first performance indicator to the second performance indicator may include ordering the first and second messages based on the comparison of the first performance indicator to the second performance indicator.

The sorted sequence of the set of messages (hereinafter referred to as the sorted set of messages) may indicate an updated order of the first and second messages, thereby positioning the first and second messages within the set of messages based on the updated order. As an example, the updated order of the first and second messages may be the same as the initial order of the first and second messages. As another example, the updated order of the first and second messages may be a reversal of the initial order of the first and second messages. In some embodiments, the sorted set of messages may be transmitted to a plurality of devices associated with user identifiers. In such embodiments, the first and second messages may be transmitted in accordance to the updated order. In some embodiments, an updated first performance indicator may be determined at least based on responses to the first message in the updated position within the sorted set of messages. The updated first performance indicator may be compared with the first performance indicator to determine a positional value of the first message in the updated position within the sorted set of messages. Similarly, an updated second performance indicator may be determined at least based on responses to the second message in the updated position within the sorted set of messages. The updated second performance indicator may be compared with the second performance indicator to determine a positional value of the second message in the updated position within the sorted set of messages.

In some embodiments, the method 300 may include an additional step of transmitting the set of messages, e.g., the first and second messages, to a plurality of devices associated with user identifiers in accordance to the initial order. In such embodiments, an initial first performance indicator may be determined at least based on responses to the first message in the initial position within the set of messages. Similarly, an initial second performance indicator may be determined at least based on responses to the second message in the initial position within the set of messages.

In some embodiments, the updated first performance indicator may be compared with the initial first performance indicator to determine a positional value of the first message in the updated position within the sorted set of messages. Similarly, the updated second performance indicator may be compared with the initial second performance indicator to determine a positional value of the second message in the updated position within the sorted set of messages.

Figure 4:
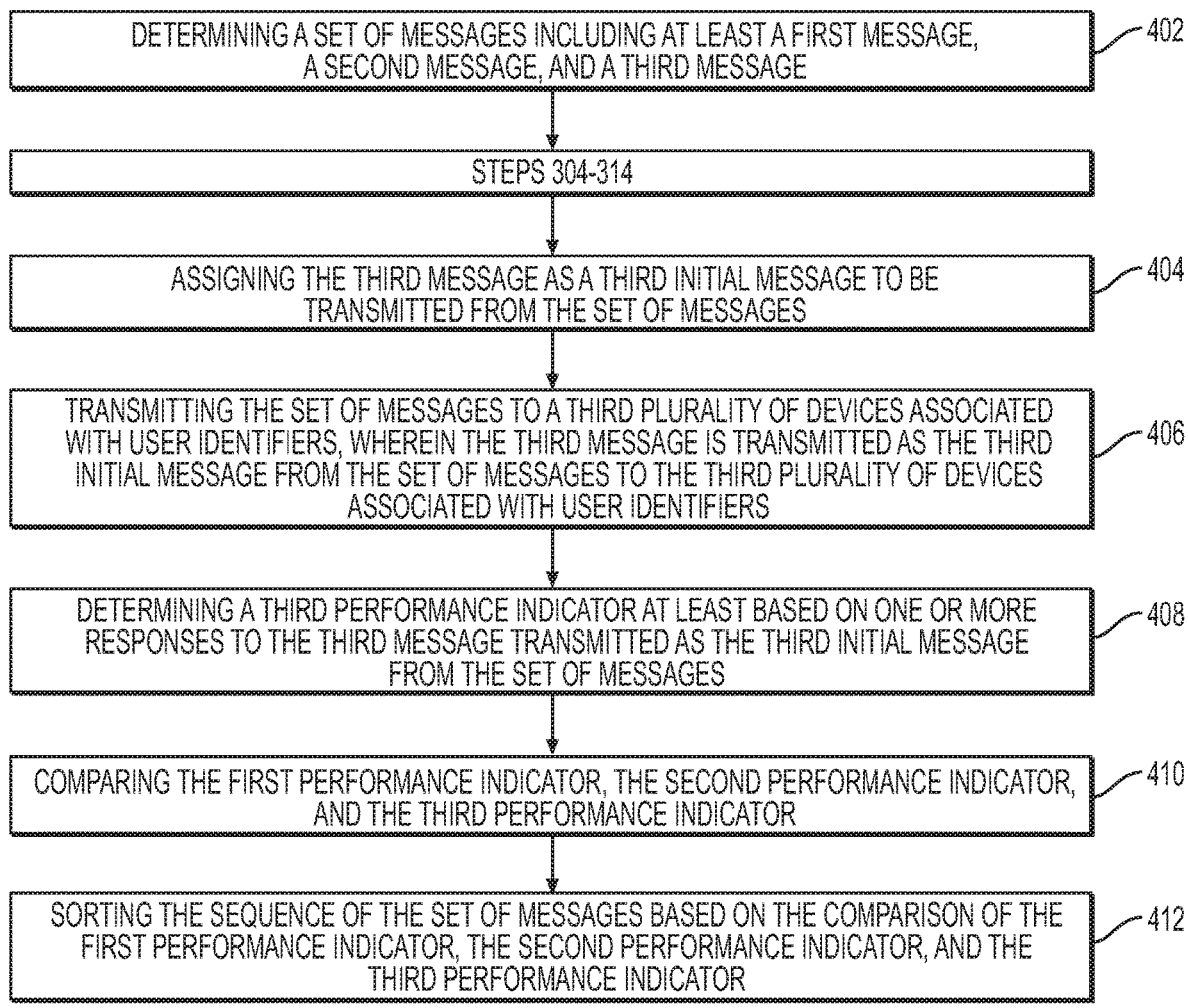
FIG. 4 depicts an exemplary method of optimizing user experience, according to exemplary embodiments of the present disclosure.

FIG. 4 depicts an exemplary method 400 of optimizing user experience, according to exemplary embodiments of the present disclosure. It is understood that the steps depicted in and described with reference to FIG. 4 may be performed in any order, e.g., in parallel. In step 402, a set of messages including at least a first message, a second message, and a third message may be determined. In some embodiments, the first, second, and third messages may contain any type of content that may provide value to a potential subscriber. For example, the first, second, and third message may each be one of the following: a monetary value email (e.g., a rent value email), a funnel email, an offer email, a recommendation email, a time sensitive offer email, a recommendation email or a testimonial email. The method 400 next proceeds to steps 304 through 314 as depicted in and described with reference FIG. 3.

In step 404, the third message may be assigned as a third initial message from the set of messages to be transmitted to one or more user devices. In step 406, the set of messages may be transmitted to a third plurality of devices associated with user identifiers, where the third message is transmitted as the third initial message from the set of messages to the third plurality of devices associated with user identifiers. In some embodiments, each of the third plurality of user identifiers may be associated with a customer of an electronic subscription platform. In step 408, a third performance indicator may be determined at least based on one or more responses to the third message transmitted as the third initial message from the set of messages. In some embodiments, determining the third performance indicator may include determining a third click per send measurement for the customers associated with the third plurality of user identifiers.

In some embodiments, the first performance indicator, the second performance indicator, and/or the third performance indicator may be compared with a predetermined threshold. For example, the determined first click per send measurement, the determined second click per send measurement, and/or the determined third click per send measurement may be compared with a predetermined click per send measurement. In such embodiments, the first message, the second message, and/or the third message may be discarded upon a determination that the first performance indicator, the second performance indicator, and/or the third performance indicator does not exceed the predetermined threshold. It is understood that the comparison of the first performance indicator, the second performance indicator, and third performance indicator with the predetermined threshold may be performed in any order. For example, the comparison of the first performance indicator, the second performance indicator, and the third performance indicator with the predetermined threshold may be performed in parallel.

In step 410, the first performance indicator, the second performance indicator, and the third performance indicator may be compared. In some embodiments, comparing the first performance indicator, the second performance indicator, and the third performance indicator may include comparing the determined first click per send measurement, the determined second click per send measurement, and the determined third click per send measurement. In step 412, the sequence of the set of messages may be sorted based on the comparison of the first performance indicator, the second performance indicator, and the third performance indicator. In some embodiments, sorting the sequence of the set of messages based on the comparison of the first performance indicator, the second performance indicator, and the third performance indicator may include ordering the first, second, and third messages based on the comparison of the first performance indicator, the second performance indicator, and the third performance indicator.

Figure 5:
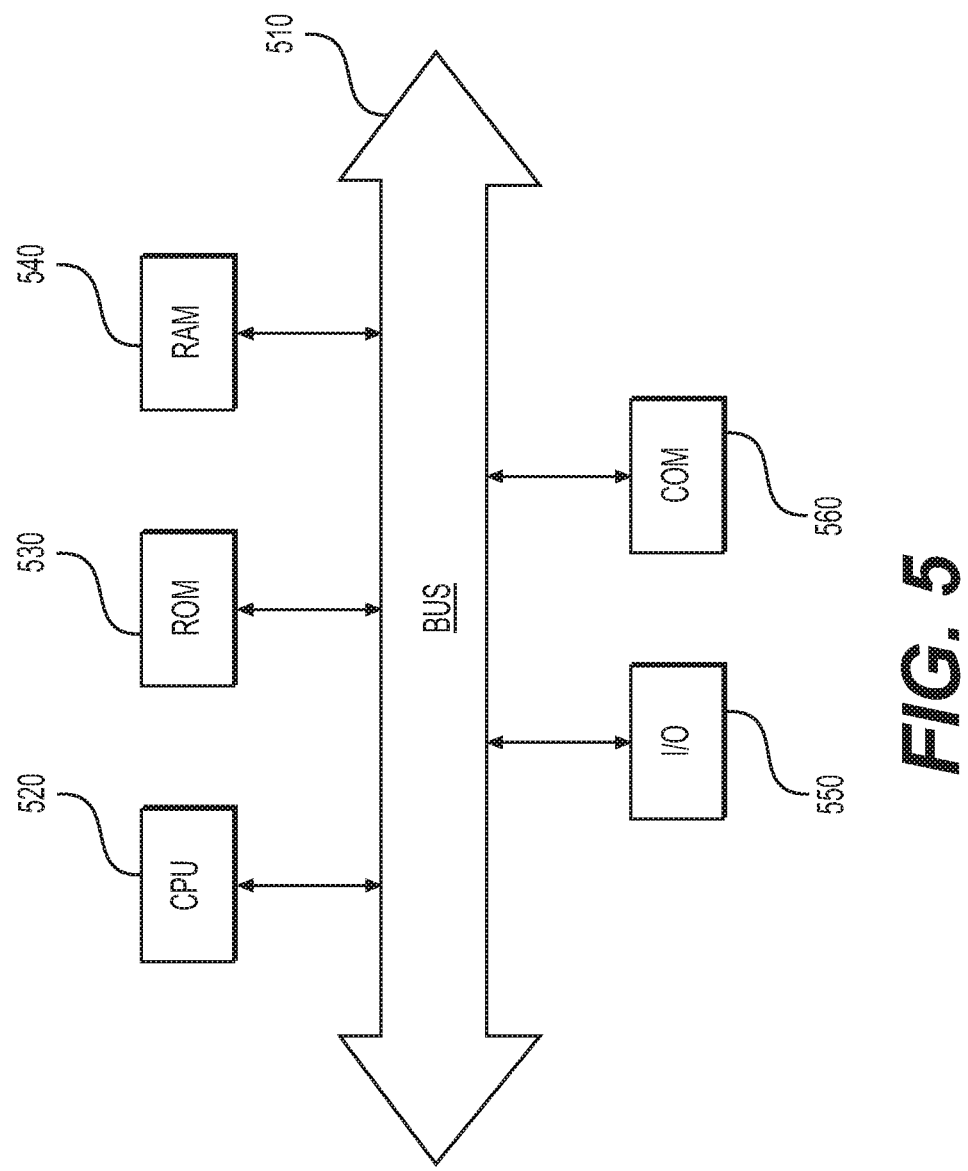
FIG. 5 depicts an exemplary computer device or system, in which embodiments of the present disclosure, or portions thereof, may be implemented.

As shown in FIG. 5, a device 500 used for performing the various embodiments of the present disclosure (e.g., the server system 102, the user devices 112, the employee devices 116, the tenant devices 120, and/or any other computer system or user terminal for performing the various embodiments of the present disclosure) may include a central processing unit (CPU) 520. CPU 520 may be any type of processor device including, for example, any type of special purpose or a general-purpose microprocessor device. As will be appreciated by persons skilled in the relevant art, CPU 520 also may be a single processor in a multi-core/multiprocessor system, such system operating alone, or in a cluster of computing devices operating in a cluster or server farm. CPU 520 may be connected to a data communication infrastructure 510, for example, a bus, message queue, network, or multi-core message-passing scheme.

A device 500 (e.g., the server system 102, the user devices 112, the employee devices 116, the tenant devices 120, and/or any other computer system or user terminal for performing the various embodiments of the present disclosure) may also include a main memory 540, for example, random access memory (RAM), and may also include a secondary memory 530. Secondary memory, e.g., a read-only memory (ROM), may be, for example, a hard disk drive or a removable storage drive. Such a removable storage drive may comprise, for example, a floppy disk drive, a magnetic tape drive, an optical disk drive, a flash memory, or the like. The removable storage drive in this example reads from and/or writes to a removable storage unit in a well-known manner. The removable storage unit may comprise a floppy disk, magnetic tape, optical disk, etc., which is read by and written to by the removable storage drive. As will be appreciated by persons skilled in the relevant art, such a removable storage unit generally includes a computer usable storage medium having stored therein computer software and/or data.

In alternative implementations, secondary memory 530 may include other similar means for allowing computer programs or other instructions to be loaded into device 500. Examples of such means may include a program cartridge and cartridge interface (such as that found in video game devices), a removable memory chip (such as an EPROM, or PROM) and associated socket, and other removable storage units and interfaces, which allow software and data to be transferred from a removable storage unit to device 500.

A device 500 may also include a communications interface ("COM") 560. Communications interface 560 allows software and data to be transferred between device 500 and external devices. Communications interface 560 may include a modem, a network interface (such as an Ethernet card), a communications port, a PCMCIA slot and card, or the like. Software and data transferred via communications interface may be in the form of signals, which may be electronic, electromagnetic, optical, or other signals capable of being received by communications interface 560. These signals may be provided to communications interface 560 via a communications path of device 500, which may be implemented using, for example, wire or cable, fiber optics, a phone line, a cellular phone link, an RF link or other communications channels.

The hardware elements, operating systems, and programming languages of such equipment are conventional in nature, and it is presumed that those skilled in the art are adequately familiar therewith. A device 500 also may include input and output ports 550 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

The systems, apparatuses, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these the apparatuses, devices, systems, or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context.

It is intended that the specification and examples be considered as exemplary only, with a true scope and spirit of the disclosure being indicated by the following claims.

What is claimed is:

1. A computer-implemented method comprising:
   determining, by one or more processors, a set of email messages including at least a first email message and a second email message at least based on data regarding email marketing information and an electronic subscription platform collected from one or more sources and converted to one or more predetermined formats;
   assigning, by the one or more processors, the first email message as a first initial email message from the set of email messages to be transmitted to one or more user devices;
   transmitting, by the one or more processors, the set of email messages to a first plurality of devices associated with user identifiers, wherein each of the first plurality of user identifiers is associated with a customer of the electronic subscription platform, and wherein the first email message is transmitted as the first initial email message from the set of email messages to the first plurality of devices associated with user identifiers;
   determining, by the one or more processors, a first performance indicator at least based on one or more responses to the first email message transmitted as the first initial email message from the set of email messages;
   assigning, by the one or more processors, the second email message as a second initial email message from the set of email messages to be transmitted to one or more user devices;
   transmitting, by the one or more processors, the set of email messages to a second plurality of devices associated with user identifiers, wherein each of the second plurality of user identifiers is associated with a customer of the electronic subscription platform, and wherein the second email message is transmitted as the second initial email message from the set of email messages to the second plurality of devices associated with user identifiers;
   determining, by the one or more processors, a second performance indicator at least based on one or more responses to the second email message transmitted as the second initial email message from the set of email messages;
   comparing, by the one or more processors, the first performance indicator and the second performance indicator; and
   sorting, by the one or more processors, a sequence of the set of email messages by ordering the first email and the second email based on the comparison of the first performance indicator to the second performance indicator.

2. The computer-implemented method of claim 1, wherein determining the first performance indicator includes determining a first click per send measurement for the customers associated with the first plurality of user identifiers, and
   wherein determining the second performance indicator includes determining a second click per send measurement for the customers associated with the second plurality of user identifiers.

3. The computer-implemented method of claim 2, wherein comparing the first performance indicator and the second performance indicator includes comparing the determined first click per send measurement and the determined second click per send measurement.

4. The computer-implemented method of claim 1, wherein the set of email messages further includes a third email message, the method further comprising:
   assigning the third email message as a third initial email message to be transmitted from the set of email messages; and
   transmitting the set of email messages to a third plurality of devices associated with user identifiers, wherein each of the third plurality of user identifiers is associated with a customer of the electronic subscription platform, and wherein the third email message is transmitted as the third initial email message from the set of email messages to the third plurality of devices associated with user identifiers.

5. The computer-implemented method of claim 4, the method further comprising:
   determining a third performance indicator at least based on one or more responses to the third email message transmitted as the third initial email message from the set of email messages.

6. The computer-implemented method of claim 5, the method further comprising:

comparing the first performance indicator, the second performance indicator, and the third performance indicator; and sorting the sequence of the set of email messages based on the comparison of the first performance indicator, the second performance indicator, and the third performance indicator.

7. A computer system comprising:
a data storage device storing processor-readable instructions; and
a processor configured to execute the instructions to perform a method including:
determining a set of email messages including at least a first email message and a second email message at least based on data regarding email marketing information and an electronic subscription platform collected from one or more sources and converted to one or more predetermined formats;
assigning the first email message as a first initial email message from the set of email messages to be transmitted to one or more user devices;
transmitting the set of email messages to a first plurality of devices associated with user identifiers, wherein each of the first plurality of user identifiers is associated with a customer of an electronic subscription platform, and wherein the first email message is transmitted as the first initial email message from the set of email messages to the first plurality of devices associated with user identifiers;
determining a first performance indicator at least based on one or more responses to the first email message transmitted as the first initial email message from the set of email messages;
assigning the second email message as a second initial email message from the set of email messages to be transmitted to one or more user devices;
transmitting the set of email messages to a second plurality of devices associated with user identifiers, wherein each of the second plurality of user identifiers is associated with a customer of the electronic subscription platform, and wherein the second email message is transmitted as the second initial email message from the set of email messages to the second plurality of devices associated with user identifiers;
determining a second performance indicator at least based on one or more responses to the second email message transmitted as the second initial email message from the set of email messages;
comparing the first performance indicator and the second performance indicator; and
sorting a sequence of the set of email messages by ordering the first email and the second email based on the comparison of the first performance indicator to the second performance indicator.

8. The computer system of claim 7, wherein determining the first performance indicator includes determining a first click per send measurement for the customers associated with the first plurality of user identifiers, and
wherein determining the second performance indicator includes determining a second click per send measurement for the customers associated with the second plurality of user identifiers.

9. The computer system of claim 8, wherein comparing the first performance indicator and the second performance indicator includes comparing the determined first click per send measurement and the determined second click per send measurement.

10. The computer system of claim 7, wherein the set of email messages further includes a third email message, the method further comprising:
assigning the third email message as a third initial email message to be transmitted from the set of email messages; and
transmitting the set of email messages to a third plurality of devices associated with user identifiers, wherein each of the third plurality of user identifiers is associated with a customer of the electronic subscription platform, and wherein the third email message is transmitted as the third initial email message from the set of email messages to the third plurality of devices associated with user identifiers.

11. The computer system of claim 10, wherein the processor is further configured for:
determining a third performance indicator at least based on one or more responses to the third email message transmitted as the third initial email message from the set of email messages.

12. The computer system of claim 11, wherein the processor is further configured for:
comparing the first performance indicator, the second performance indicator, and the third performance indicator; and
sorting the sequence of the set of email messages based on the comparison of the first performance indicator, the second performance indicator, and the third performance indicator.

13. A non-transitory computer-readable medium containing instructions that, when executed by a processor, cause the processor to perform a method comprising:
determining a set of email messages including at least a first email message and a second email message at least based on data regarding email marketing information and an electronic subscription platform collected from one or more sources and converted to one or more predetermined formats;
assigning the first email message as a first initial email message from the set of email messages to be transmitted to one or more user devices;
transmitting the set of email messages to a first plurality of devices associated with user identifiers, wherein each of the first plurality of user identifiers is associated with a customer of an electronic subscription platform, and wherein the first email message is transmitted as the first initial email message from the set of email messages to the first plurality of devices associated with user identifiers;
determining a first performance indicator at least based on one or more responses to the first email message transmitted as the first initial email message from the set of email messages;
assigning the second email message as a second initial email message from the set of email messages to be transmitted to one or more user devices;
transmitting the set of email messages to a second plurality of devices associated with user identifiers, wherein each of the second plurality of user identifiers is associated with a customer of the electronic subscription platform, and wherein the second email message is transmitted as the second initial email message from the set of email messages to the second plurality of devices associated with user identifiers;

determining a second performance indicator at least based on one or more responses to the second email message transmitted as the second initial email message from the set of email messages;

comparing the first performance indicator and the second performance indicator; and sorting a sequence of the set of email messages by ordering the first email and the second email based on the comparison of the first performance indicator to the second performance indicator.

14. The non-transitory computer-readable medium of claim 13, wherein determining the first performance indicator includes determining a first click per send measurement for the customers associated with the first plurality of user identifiers, and wherein determining the second performance indicator includes determining a second click per send measurement for the customers associated with the second plurality of user identifiers.

15. The non-transitory computer-readable medium of claim 14, wherein comparing the first performance indicator and the second performance indicator includes comparing the determined first click per send measurement and the determined second click per send measurement.

16. The non-transitory computer-readable medium of claim 13, wherein the set of email messages further includes a third email message, the method further comprising:

assigning the third email message as a third initial email message to be transmitted from the set of email messages; and transmitting the set of email messages to a third plurality of devices associated with user identifiers, wherein each of the third plurality of user identifiers is associated with a customer of the electronic subscription platform, and wherein the third email message is transmitted as the third initial email message from the set of email messages to the third plurality of devices associated with user identifiers.

17. The non-transitory computer-readable medium of claim 16, the method further comprising:

determining a third performance indicator at least based on one or more responses to the third email message transmitted as the third initial email message from the set of email messages;

comparing the first performance indicator, the second performance indicator, and the third performance indicator; and sorting the sequence of the set of email messages based on the comparison of the first performance indicator, the second performance indicator, and the third performance indicator.

* * * * *